9285X
3 Sheet—Sheet 1.
B. GILL.
Cook Stove.
Patented Dec. 9, 1835.
*Section on the line A.B.*
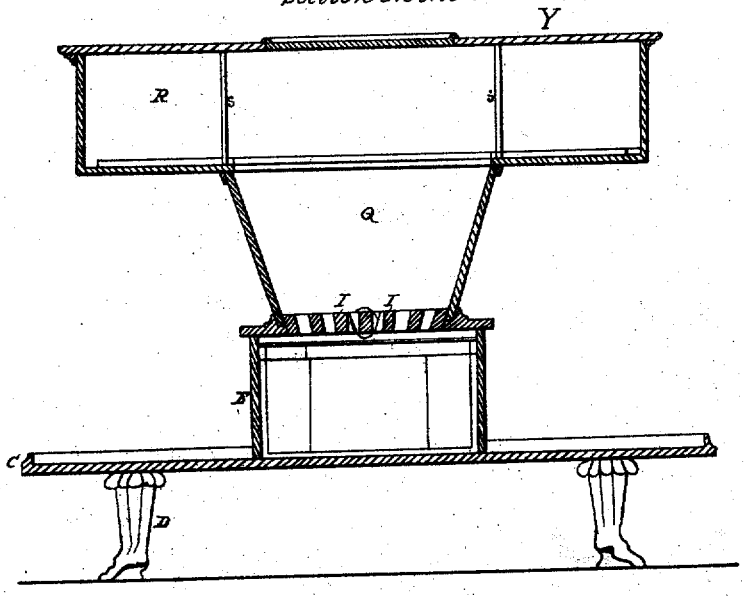
*Front View.*
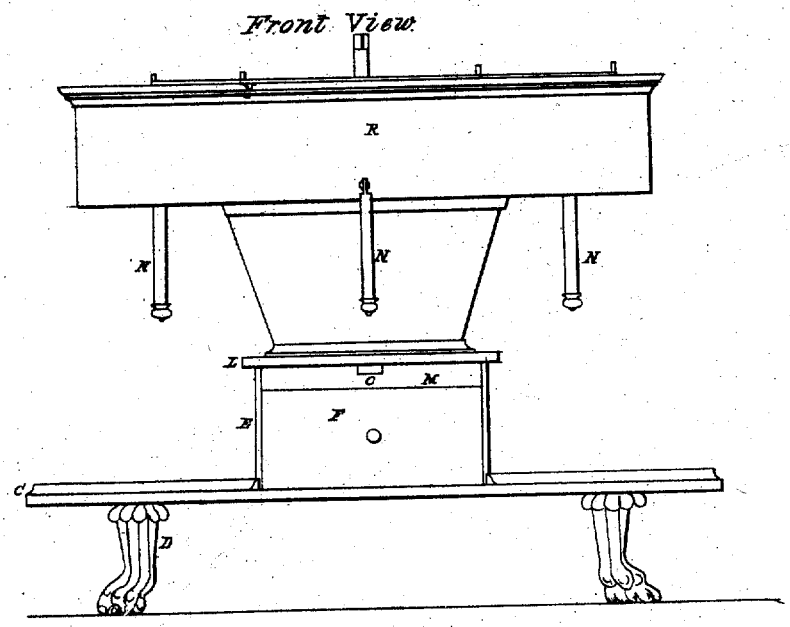

9285X
3 Sheet—Sheet 2.
B. GILL.
Cook Stove.
Patented Dec. 9, 1835.
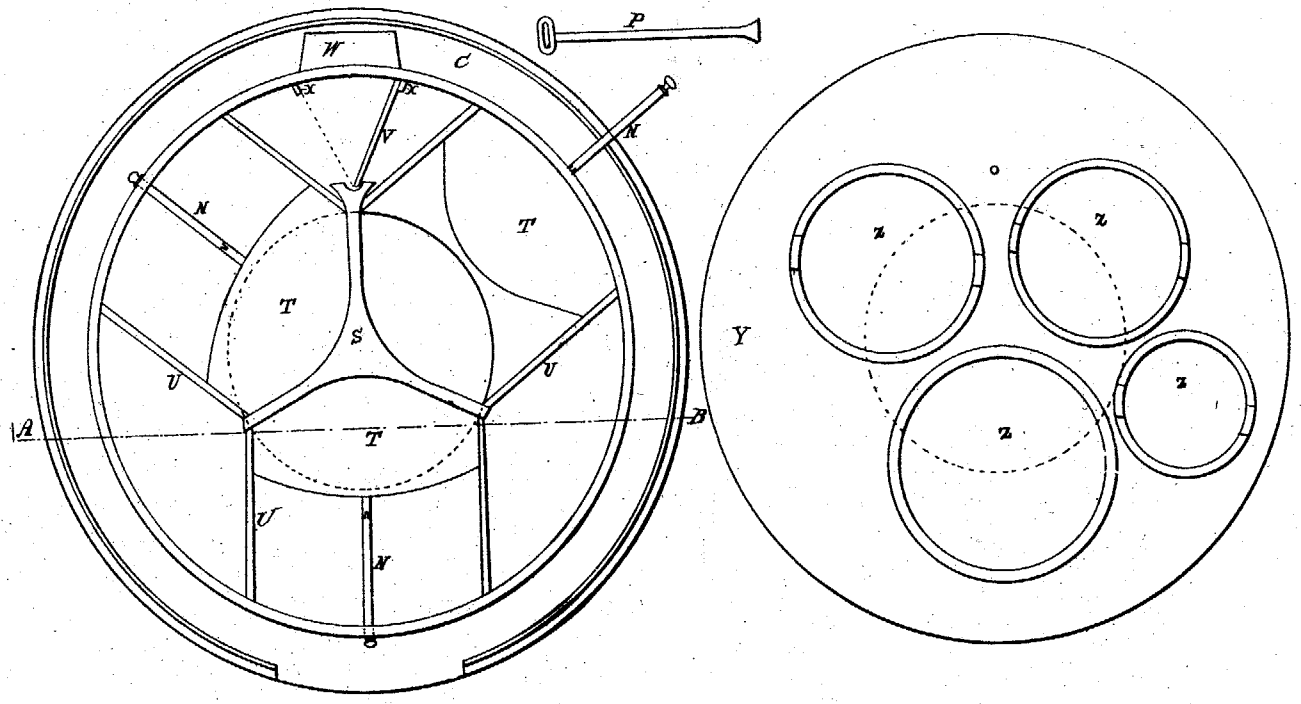

9285X
B. GILL.
Cook Stove.
3 Sheet--Sheet 3.
Patented Dec. 9, 1835.
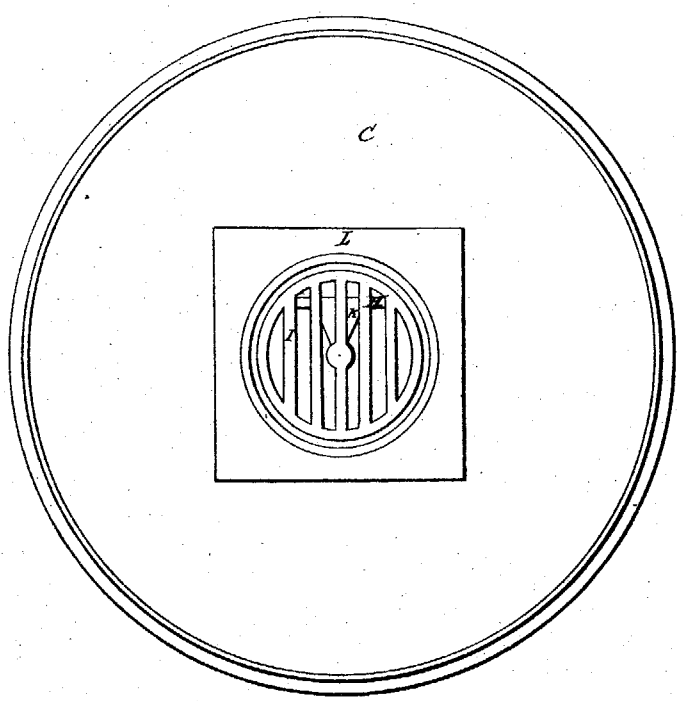
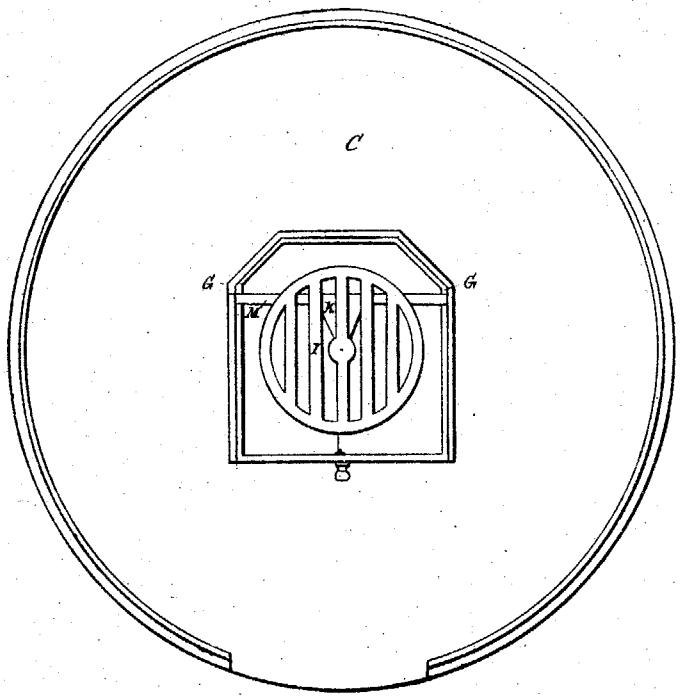

Bennington Gill of New York City.

Letters Patent.

The Schedule referred to in these Letters Patent and making part of the same containing a description in the words of the said Bennington Gill himself of his improvement in the Cooking Stove.

To all to whom these Presents shall come. Know Ye that I Bennington Gill of the City County and State of New York have invented construct-ed made and applied to use a new and useful improvement in a cooking Stove called "Gill's improved cook Stove" which improvement and the Stove wherein it is made is described as follows namely. For the bottom of the Stove I make a circular plate of Iron C (see drawings) two feet six inches in diameter and of suitable thickness. which plate I raise from the ground about five inches by feet D. (see drawings) sliding into dove-tails on the under side of it. upon the centre of this plate I place a cast Iron Box E (see drawings) ten inches square closed on three sides and open on one side for the admission of the drawer F (see drawings) to contain the ashes. this drawer is four and one half inches deep and nine & one half inches wide. On the inner surfaces of the right and left sides of this box I cast projections G (see drawings) with hollows upon the upper parts for the admission of the ends of the axle of the revolving and falling grate described below. This Box I sometimes cast permanently with the circu-lar plate forming the bottom of the stove. and sometimes cast separately and confine it to its place by rods passing thro' its cover and the plate secured by nuts below. Upon the above described projections on the interior sides of the Box. I place the axle H (see drawings) of a circular grate I (see drawings) which axle is fastened to the grate by a pin passing through the centre of the grate and a projecting part K (see drawings) of the axle. This projecting part is two inches in length and the grate is seven and three quarter inches in diameter, and revolves freely round the pin which attaches it to the axle. On the under side of the grate I cast two dove-tails each extending from the edge of the centre bar to the next bar on the side of it and back about three inches leaving a triangular slot or

9283X opening between them to receive the shaking pin P. (see drawings) this pin
I make of three eighths inch iron and flattened at one end and with a loop
on the other. Upon the top of the box above described I place the cover L. which is
a plate eleven inches square having a circular aperture in the centre eight
inches in diameter (in which the circular grate moves and having near
the front edge a projecting part M (see drawings) on the lower side one
inch wide and nine and a half inches long extending down to meet
the front of the ash drawer. In this projecting part of the cover I
make an oblong hole O (see drawings) about three inches long &
half an inch wide; through which I pass the shaking pin into the
slit between the dovetails under the grate with the flattened end in
a vertical position in which way it will pass through the slit
until the flattened end gets beyond the dovetail. when I turn the
pin so as to bring the flattened end into a horizontal position where it
cannot be drawn out being prevented by the narrowing of the passage between
the dovetails. Upon this cover I place a cylinder Q (see drawings) sev-
en and three quarter inches in diameter at bottom and twelve inches at
top and seven inches high. This is the chamber of combustion, holding
the fuel and having the circular grate at bottom. Upon the top of this cyl-
inder I place the receiver R (see drawings) which is twenty four inch-
es diameter at bottom. twenty four and three quarter inches at top
and five inches inches deep having a circular aperture in the centre
twelve inches in diameter, fitting the top of the cylinder through which
the heat and smoke ascend into the receiver. Across this circular
aperture and immediately over the cylinder, separating from each
other those parts of the boiler holes which extend over the cylinder.
I place a partition S. (see drawings) made of Iron, fire brick, soap-
stone or other suitable material having flanges on the lower edges to
receive the dampers or slides T. (see drawings) and having one of its
ends forked to facilitate the action of the valve V (see drawings.)
These dampers or slides are made to shut over that part of the circular
aperture which is under either of the Boilers so that by opening the
proper valve and closing the others, the whole current of the fire from

9285X the cylinder can be directed in the first instance under a particular
boiler. while by the action of the vertical valve described below. the heat
and smoke are compelled to pass round the receiver under any or all
the other Boilers at will. On the inner side of the bottom receiver are
pairs of cast iron guides U. (see drawings.) about three eighths of an
inch high. extending from the points where the partition rests. upon
the bottom of the receiver back to the rim or side of it so as to regulate
the action of the dampers as they are moved backward and forward.
To the damper I affix rods N (see drawings). passing through the rim
of the receiver with brass or other balls on the outer ends. about one
inch from the union of the rod with the damper I make a joint in
the rod which permits it when the damper is drawn back. to fall into
a pendant position on the outside of the receiver. On one side of the
receiver and opposite to the forked end of the partition I make an
oval opening W. (see drawings) and an oval collar for the attachment
of the pipe. On each side of the opening and attached to the inner side
of the rim of ~~the~~ receiver are projections X (see drawings) about one
inch wide extending from the bottom to the top of the receiver. against
which the vertical valve shuts as it is moved in either direction.
This valve extends from the partition to the outer edge or rim of the
receiver and is made to move in a vertical position in the groove form-
ed at the fork of the partition. so that when shut against either of
the above described projections it shuts out the passage of the heat
and smoke from the Receiver to the pipe in that direction. On the top
of the Receiver. I place I place the cover Y (see drawings) a circular
plate fitting by a groove or bead to the receiver in which are holes to admit
the cooking utensils or fuel. which holes when not occupied by the cooking
utensils are covered by griddles Z. (see drawings) The vertical valve
is moved by a handle attached to a part of it projecting through the cover
of the receiver. by which valve the draft can be made to pass round the
top of the Stove or receiver and Boilers in it from right to left or from
left to right at pleasure. or I place a permanent partition across
from the side of the receiver to the inner partition and dispense with

9285X the vertical valve. The stove above described is intended for burning coal. When wood is to be used for fuel the forms of the chamber of combustion and lower parts of the stove are altered, but the receiver is the same as above described, and the flame and smoke ascend into it in the same manner through the circular aperture in the bottom. I perform baking & and roasting in all or either of the following ways. 1st By an iron oven in the rear of the chamber of combustion, round which I cause the fire to circulate before it is admitted into the receiver above.
2nd By tin or other reflectors placed under the receiver and in front or at the sides and back or around the chamber of combustion, or. 3d By tin or other ovens & reflectors placed upon the top of the receiver.
The forms of the Receiver of the Boilers and the Boiler holes, of the partition within the receiver and the valves may be varied, but in all cases in such manner that the direct communication between the chamber of combustion and the bottom of each boiler may be shut off at pleasure by valves operating either by sliding horizontally or vertically, or turning upon an axle or in any other mode that the form adopted for the Boiler holes & receiver may render expedient. By which means as will be seen by reference to the model a great economy of fuel is effected. The heated air in its course to the chimney is so directed as to pass under the bottoms of all the Boilers and at the same time effectually to warm the ovens. while valves so command the direct heat from the fire that a greater or less portion can be had at pleasure for each or any Boiler without disturbing or deranging the action of the heat upon any other Boiler or upon the oven. A comparison of this model with any stove previously made will show its excellency. The top or receiver may be square or circular as in the model and drafts or angular or, an hexagon or an octagon or any other convenient form and may with the other parts of the stove be varied in size to suit the purchaser. taking care to preserve the proportions. The drawings annexed will show more accurately the form of the parts and to them reference is made.
The part of the above described stove in which my improvement is made is the top or that part which is above the fire arch or chamber for 1839 9283X the fuel and which I have called the Receiver, and it consists in the new arrangements above described in a stationary top of the stove so as effectually to distribute and guide the heat when generated to the vessels or objects for which it is wanted in such proportions & in such times & in such manner as may be required. This is effected by arranging the cooking utensils or vessels over the fire as above described & by providing the horizontal slides or valves to close in part or whole as may be needed the apertures through which the flame & heat ascend and by means of the perpendicular valve or other fixture at or near the smoke pipe or outlet of the top for the purpose of giving direction to the flame and heat and the internal arrangement & construction of the above described parts in and upon the top of the stove, the whole being combined in such a manner as to produce the desired results. I claim as my invention and improvement the construction arrangement and combination of the above described parts composing the interior of the top of said Stove and any other similar arrangement & combination of similar parts for the same purpose placed over the fire in the top of a Stove for the purposes aforesaid and for this improvement I request Letters Patent.

Witnesses
J. B. Staples
James Humphreys

Bennington Gill.

(2220 words)

(Drawing.)